United States Patent Office 3,094,495
Patented June 18, 1963

3,094,495
PROCESS FOR PREPARING CELLULAR POLYURETHANES FROM MIXTURE OF TWO PREPOLYMERS AND RESULTING PRODUCT
Paul G. Gemeinhardt, Sistersville, W. Va., assignor to Mobay Chemical Company, Pittsburgh, Pa., a corporation of Delaware
No Drawing. Filed Sept. 15, 1958, Ser. No. 760,832
6 Claims. (Cl. 260—2.5)

This invention relates to polyurethane plastics and, more particularly, to cellular polyurethane plastics obtained from the reaction of organic polyisocyanate and water with mixtures of organic compounds having free —NCO groups which are essentially reaction products of organic compounds having at least two reactive hydrogen atoms with an excess of an organic polyisocyanate.

It has been known heretofore to use, in the manufacture of polyurethane plastics, polyalkylene ether glycols by themselves or in admixture with a condensation product of alkylene oxides with a triol or other alcohol having more than two hydroxyl groups, which have been modified with the addition of an excess of an organic polyisocyanate to form a compound having free —NCO groups. Such a compound is suitable for further reaction with an organic polyisocyanate and water to form a cellular polyurethane. These modified polyalkylene ether glycols are usually referred to as prepolymers. The polyalkylene ether glycol molecule has been enlarged to an extent to become sufficiently viscous to be readily admixed with organic polyisocyanates and water to form cellular polyurethanes. This increase in viscosity also tends to prevent the escape of carbon dioxide evolved by the reaction between water and an isocyanate group.

The heretofore known prepolymers, when reacted with additional organic polyisocyanate and water, provide polyurethane cellular plastics which are not always uniform or pleasing in appearance. For instance, the cellular polyurethanes may contain voids or tears therein. Moreover, often it is somewhat difficult to break the individual cell walls within the block of cellular polyurethane by crushing. The cell walls must be ruptured to prevent shrinkage of the block after it has been formed.

It is, therefore, the primary object of the present invention to provide polyurethane cellular plastics which have both a pleasing appearance and are easily and readily crushed to open the cells within the blocks. It is another object of the present invention to provide a process for obtaining cellular polyurethanes which have a uniform density throughout their cross-section. Still another object is to provide polyurethane cellular plastics which are free of internal voids. A further object is to provide an economical means to manufacture polyurethane cellular plastics of a wide range of physical properties which are obtained from various mixtures of only a small number of basic prepolymers.

The foregoing objects and others are accomplished, generally speaking, by providing a process wherein at least two separate and distinct prepolymers are first prepared by reaction between an excess of an organic polyisocyanate and an organic compound having at least two reactive hydrogen atoms under substantially anhydrous conditions. The two prepolymers are then mixed together and reacted with water to form a cellular polyurethane. Unreacted organic polyisocyanate may be included in the reaction mixture to react with the water to provide additional blowing gas if desired. The invention is predicated on the discovery that a cellular polyurethane prepared from a mixture or blend of prepolymers has properties which are more desirable than the properties of a cellular polyurethane prepared from either single prepolymer alone, and is substantially free of voids and large pores.

The invention thus contemplates a two-step process in which at least two prepolymers are prepared separately and are then blended together and reacted with water in a second step. The prepolymers contemplated by this invention have terminal —NCO groups and are preferably prepared by the reaction of a condensation product of an alkylene oxide with an organic polyisocyanate present in an amount in excess over that theoretically required to react with all of the hydroxyl groups of the condensation product. The above reaction is carried out at a temperature range of from about 30° C. to about 150° C. and, preferably, at a temperature range of from about 90° C. to about 130° C. The prepolymers thus formed contain allophanate groups resulting from the reaction of organic polyisocyanate with the active hydrogen atoms present on the urethane linkages previously formed in the prepolymer by the reaction between an isocyanate group and an hydroxyl group.

The condensation product may be prepared by condensing any suitable alkylene oxide having from 2 to 5 carbon atoms, such as, for example, ethylene oxide, propylene oxide, butylene oxide, amylene oxide, or mixtures thereof. Furthermore, the condensation product may be used in admixture with other suitable compounds, for example, 1,4-butylene glycol, glycerine, trimethylol propane, pentaerythritol, tartaric acid, esters, castor oil, and the like. A prepolymer prepared by polymerization of tetrahydrofuran may also be used alone or in combination with one or more of the condensation products of an alkylene oxide. It is to be understood that the term "condensation product" is intended to include the tetramethylene ether glycol prepared by polymerization of tetrahydrofuran. The condensation product preferably should have a molecular weight of at least about 500 and an hydroxyl number of not more than about 225. In addition, prepolymers may be prepared which are the reaction product of an excess organic polyisocyanate with any suitable polyester. Suitable polyesters are those having terminal hydroxyl groups and a specific gravity within the range of about 0.02–1.4 and may be either branched or linear. Useful polyesters may be obtained by condensing any polybasic (preferably dibasic carboxylic) organic acid, such as, adipic acid, sebacic, phthalic, isophthalic, terphthalic, oxalic, malonic, succinic, maleic, cyclohexane-1,2-dicarboxylic, fumaric, itaconic, etc., with polyalcohols, such as ethylene glycol, diethylene glycol, pentaglycol, glycerol, sorbitol, triethanolamine, and the like. Indeed, prepolymers may be prepared by reacting an excess of an organic polyisocyanate with any suitable organic compound having at least two reactive hydrogen atoms and a molecular weight of at least about 500, such as, for example, polyalkylene ether glycols, polyesters, polyester amides, and the like, as well as polythioether glycols, which may be prepared by condensing thiodiglycol with a suitable polyhydric alcohol, such as, ethylene glycol, in the presence of a catalyst.

Although a beneficial result and an improved product is obtained when any two or more prepolymers are blended together to provide the compound having reactive —NCO groups, it has been found that the result is more pronounced when one of the prepolymers is prepared by reaction between an excess organic polyisocyanate and a polyalkylene ether glycol having a molecular weight of at least about 500, and the other prepolymer is prepared by reaction of an excess organic polyisocyanate with a mixture of said polyalkylene ether glycol and a triol or other alcohol having more than two hydroxyl groups which is condensed with an alkylene oxide to form a branched compound having a molecular weight of at least about 1000. A blend of these two prepolymers, which is subsequently reacted with water, provides cellular polyurethanes which have a very pleasing appearance and softness to the touch, is easily crushed to rupture the cells therein, and is substantially free from voids.

Any suitable alcohol having more than two hydroxyl groups may be condensed with any of the alkylene oxides referred to above. Examples of suitable alcohols having more than two hydroxyl groups are glycerine, trimethylol propane, hexanetriol, pentaeyrithritol, and the like.

As indicated herein above, the reaction between the condensation product and an organic polyisocyanate is effected under "substantially anhydrous conditions." By "substantially anhydrous conditions," as used herein, is meant not more than about 0.5% by weight, the water based on the weight of the condensation product of an alkylene oxide used in the reaction.

The prepolymers may be blended in any ratio, indeed, often even a relatively small amount of a prepolymer which, for instance, contains as a base a mixture of polyalkylene ether glycol and a condensation product of an alkylene oxide and a triol, will improve the resultant cellular polyurethanes obtained over those obtained from prepolymers based upon polyalkylene ether glycols alone.

In one embodiment of the invention, propylene oxide is condensed into a polypropylene ether glycol having a molecular weight of at least about 500 and then on each end of this product is condensed ethylene oxide to provide a polyalkylene ether glycol having primary hydroxyl groups.

The blending of the prepolymers is best effected at elevated temperatures, such as, about 50° C. with stirring for about 2 to about 3 hours. The higher temperature is used to facilitate transfer of the prepolymer from the blend tank to storage facilities.

Any suitable organic polyisocyanate may be used in accordance with the present invention, such as, for example, tetramethylene diisocyanate, hexamethylene diisocyanate, m-xylylene diisocyanate, p-xylylene diisocyanate, 4,6-dimethyl-1,3-xylylene diisocyanate, cyclohexane-1,4-diisocyanate, dicyclohexylmethane-4,4'-diisocyanate, m-phenylene diisocyanate, p-phenylene diisocyanate, toluylene diisocyanate, 3-(alpha-isocyanato-ethyl)-phenyl isocyanate, 1-alkyl benzene-2,6-diisocyanate, 2,6-diethyl benzene-1,4-diisocyanate, diphenyl methane-4,4'-diisocyanate, diphenyl dimethyl methane-4,4'-diisocyanate, 3,3'-dimethoxy diphenyl methane-4,4'-diisocyanate, naphthalene-1,5-diisocyanate, and the like.

Any suitable activator may be used to accelerate the formation of the cellular polyurethane plastics provided by this invention. Suitable activators include methyl morpholine or ethyl morpholine, the tertiary amines (either individually or in mixtures) such as, dimethylhexahydroaniline, diethylhexahydroaniline, reaction products of N,N'-diethylaminoethanol and phenylisocyanate, esteramines, etc. Also sodium phenolates added with suitable plasticizers may be employed with the manufacture of cellular polyurethane plastics.

In addition, additives which control the cell size of the cellular polyurethane to insure that a uniform density is obtained may be used. Particularly suitable additives are the silicone oils. Any suitable liquid organo polysiloxane may be used as a silicone oil provided the viscosity thereof is from about 10 to about 500 centistokes at 20° C. Examples of suitable silicone oils include dimethyl siloxane polymers having a viscosity of about 50 centistokes, dimethyl siloxane polymers having a viscosity of about 140 centistokes, and dimethyl siloxane polymers having a viscosity of about 440 centistokes at 20° C., and mixtures thereof.

The invention is illustrated, without being limited thereto, by the following examples, the parts being by weight:

*Example 1*

A polyalkylene ether glycol-based prepolymer was prepared by adding to about 100 parts of a polypropylene ether glycol having a molecular weight of about 2000, about 0.3 part of propylene oxide and about 0.3 part of benzoyl chloride and stirring for one-half hour. About 15 parts of toluylene diisocyanate were added, and the mixture stirred for about 2 hours with forced cooling. The mixture was then heated to about 90° C. to about 95° C. and held at this temperature for 2 hours. The temperature was then elevated to from about 135° C. to about 140° C. until the viscosity of the mixture reaches about 1300 centipoises at 73° C. Then about 15.2 parts of toluylene diisocyanate was added and the mixture allowed to cool to about 100° C. About .03 part of benzoyl chloride was added and mixed for about an hour while the mixture was cooled to 75° C.

When the above prepolymer alone was admixed with about 7.4 parts of toluylene diisocyanate, 2.4 parts of water, about 1 part of silicone oil, and about 2.3 parts of a suitable activator mixture in an apparatus, such as is disclosed in U.S. Patent No. 2,764,565, a cellular polyurethane block was obtained which has an excellent appearance but is difficult to crush. The cellular polyurethane plastic exhibited the following physical properties: a density of about 2.2 pounds per cubic foot, a tensile strength of about 24 pounds per square inch, an elongation of about 385%, and a cell count of about 42 per linear inch.

A second prepolymer based upon a mixture of polyalkylene ether glycols and a branched polyaddition product is prepared by charging about 60 parts by weight of a polypropylene ether glycol of a molecular weight of about 2000, about 40 parts of a branched polyaddition product of about 3000 molecular weight and based upon the reaction product of glycerine and propylene oxide, and about .03 part benzoyl chloride into a suitable reaction vessel and stirring for about one hour. About 14.1 parts of toluylene diisocyanate was added and the mixture stirred for about two hours while being cooled. Then, the reaction mixture was heated to about 110° C. to about 115° C. and held at this temperature until the viscosity reached about 1650 centipoises at 73° C. About 16.9 parts of a second addition of toluylene diisocyanate were added and the mixture cooled to about 100° C. A second addition of about .03 part of benzoyl chloride was added and the reaction mixture stirred for about two hours while cooling to about 75° C.

When the above prepolymer alone was admixed with about 6.6 parts of toluylene diisocyanate, about 2.4 parts of water, about .75 part of silicone oil, and about 2.3 parts of an activator mixture in a suitable appartus, such as is disclosed in U.S. Patent No. 2,764,565, a cellular polyurethane plastic block was obtained which was of poor appearance and had many voids, tears, and blisters within the block. The cellular polyurethane block was, however, easily crushed.

About 95 parts of the first prepolymer was admixed with about 5 parts of the second prepolymer by stirring together at a temperature of about 50° C. for about two to three hours. The mixture was then admixed with about 7.4 parts of toluylene diisocyanate, 2.4 parts water, about 0.9 part of silicone oil, and about 2.3 parts of a suitable activator in an apparatus such as is disclosed in U.S. Patent No. 2,764,565. A cellular polyurethane plastic block was formed having an excellent appearance and which exhibited the following physical properties: a density of about 2.3 pounds per cubic foot, a tensile strength of about 24.9 pounds per square inch, and an elongation of about 360%, and a cell count of about 38 per linear inch. The cellular polyurethane block was crushed without difficulty.

*Example 2*

About 85 parts of the first prepolymer described in Example 1, and about 15 parts of the second prepolymer described in Example 1, were admixed by stirring for about 2 to about 3 hours. The mixture is then admixed in a suitable apparatus such as is described in U.S.

Patent No. 2,764,565, with about 7.4 parts toluylene diisocyanate, about 2.4 parts of water, about 0.9 part silicone oil, and about 2.3 parts of a suitable catalyst. An excellent appearing and easily crushed block of cellular polyurethane plastic was obtained which exhibited the following properties: a density of about 2.3 pounds per cubic foot, a tensile strength of about 24.9 per square inch, an elongation of about 374%, and a cell count of about 38 per linear inch.

*Example 3*

About 75 parts of the first prepolymer described in Example 1, was admixed with about 25 parts of the second prepolymer described in Example 1, by stirring for about 2 to about 3 hours. The mixture was then admixed in a suitable apparatus with about 7.2 parts of tolylene diisocyanate, 2.4 parts of water, 0.9 part of silicone oil, and about 2.3 parts of a suitable activator and catalyst mixture in an apparatus such as is disclosed in U.S. Patent No. 2,764,565. An excellent appearing and easily crushed polyurethane cellular block was obtained having the following physical properties: a density of about 2.3 pounds per cubic foot, a tensile strength of about 23 pounds per square inch, an elongation of about 320%, and a cell count of about 34 per linear inch.

*Example 4*

About 50 parts of the first prepolymer described in Example 1, was admixed with about 50 parts of the second prepolymer described in Example 1, by stirring for about 2 to about 3 hours. The mixture was then admixed in a suitable apparatus, such as described in U.S. Patent No. 2,764,565, with about 7 parts of tolylene diisocyanate, 2.4 parts of water, 0.75 part of silicone oil, and about 2.3 parts of a mixture of an activator and a catalyst. An excellent appearing polyurethane cellular block is obtained which was crushed without difficulty. The cellular polyurethane exhibited the following properties: a density of about 2.1 pounds per cubic foot, a tensile strength of about 20.7 pounds per square inch, an elongation of about 325%, and a cell count per linear inch of about 32.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. In a process for the preparation of a cellular polyurethane plastic by a process which comprises reacting an excess of an organic polyisocyanate with a polyhydric polyalkylene ether under substantially anhydrous conditions in a first step to prepare an isocyanato terminated prepolymer and subsequently reacting said prepolymer with water and additional organic polyisocyanate to generate carbon dioxide and prepare a cellular polyurethane plastic, the improvement which comprises reacting a mixture of at least two separate, distinct prepolymers (*a*) and (*b*) with water and additional organic polyisocyanate to prepare a cellular polyurethane plastic, wherein prepolymer (*a*) is the reaction product of an excess of an organic polyisocyanate with a polyalkylene ether glycol having a molecular weight of at least about 500 under substantially anhydrous conditions at a temperature within the range of from about 30° C. to about 150° C. to prepare a prepolymer containing allophanate groups, prepolymer (*b*) is the reaction product of an organic polyisocyanate with a mixture of a polyalkylene ether glycol having a molecular weight of at least about 500 and a polyhydric polyalkylene ether containing more than two hydroxyl groups and having a molecular weight of at least about 1000 under substantially anhydrous conditions at a temperature within the range of about 30° C. to about 150° C. to prepare a prepolymer containing allophanate groups, the relative amounts of (*a*) and (*b*) being within the range of about 50 to about 95 percent by weight of one to about 50 to about 5 percent by weight of the other.

2. The process of claim 1 wherein prepolymer (*a*) is the reaction product of an excess of tolylene diisocyanate with a polypropylene ether glycol.

3. The process of claim 1 wherein prepolymer (*b*) is the reaction product of tolylene diisocyanate with a mixture of a polypropylene ether glycol and a trihydric polyalkylene ether which is the condensate of glycerine with propylene oxide.

4. The process of claim 1 wherein the reaction temperature in the preparation of both prepolymer (*a*) and prepolymer (*b*) is within the range of from about 90 to 130° C.

5. The process of claim 1 wherein said organic polyisocyanate is tolylene diisocyanate.

6. The product of the process of claim 1.

References Cited in the file of this patent

UNITED STATES PATENTS

| | | |
|---|---|---|
| 2,764,565 | Hoppe et al. | Sept. 25, 1956 |
| 2,866,774 | Price | Dec. 30, 1958 |
| 2,877,193 | Roussel | Mar. 10, 1959 |
| 2,877,212 | Seligman | Mar. 10, 1959 |
| 2,888,411 | Pace | May 26, 1959 |
| 2,894,919 | Simon et al. | July 14, 1959 |
| 2,993,869 | Gmitter et al. | July 25, 1961 |